United States Patent
Besore et al.

(10) Patent No.: US 8,423,194 B2
(45) Date of Patent: Apr. 16, 2013

(54) GENERATOR DEMAND RESPONSE BEHAVIOR

(75) Inventors: John K. Besore, Louisville, KY (US); Timothy Dale Worthington, Louisville, KY (US); Michael F. Finch, Louisville, KY (US); Jeff Donald Drake, Louisville, KY (US); Nagaraju Valluri, Louisville, KY (US)

(73) Assignee: General Electric Company, Schenectady, NY (US)

(*) Notice: Subject to any disclaimer, the term of this patent is extended or adjusted under 35 U.S.C. 154(b) by 8 days.

(21) Appl. No.: 13/042,526

(22) Filed: Mar. 8, 2011

(65) Prior Publication Data

US 2012/0029711 A1 Feb. 2, 2012

(51) Int. Cl.
*G05D 3/12* (2006.01)
*G05B 11/01* (2006.01)
*H02J 1/10* (2006.01)
*H02J 3/14* (2006.01)
*G08B 23/00* (2006.01)
*G08B 21/00* (2006.01)

(52) U.S. Cl.
USPC ........... 700/286; 700/22; 700/287; 700/295; 307/29; 307/38; 340/500; 340/540

(58) Field of Classification Search ............ 700/16, 700/18, 22, 275, 286, 297; 307/29, 38–39; 340/500–501, 540
See application file for complete search history.

(56) References Cited

U.S. PATENT DOCUMENTS

| | | | |
|---|---|---|---|
| 4,247,786 A | 1/1981 | Hedges | |
| 6,697,951 B1* | 2/2004 | Sinha et al. | 713/300 |
| 6,817,195 B2 | 11/2004 | Rafalovich et al. | |
| 7,010,363 B2 | 3/2006 | Donnelly et al. | |
| 7,110,832 B2 | 9/2006 | Ghent | |
| 7,266,962 B2 | 9/2007 | Montuoro et al. | |
| 7,705,484 B2* | 4/2010 | Horst | 307/35 |
| 2001/0010032 A1* | 7/2001 | Ehlers et al. | 702/62 |
| 2002/0024332 A1* | 2/2002 | Gardner | 324/103 R |
| 2003/0233201 A1 | 12/2003 | Horst et al. | |
| 2004/0024494 A1* | 2/2004 | Bayoumi et al. | 700/286 |
| 2004/0153170 A1* | 8/2004 | Santacatterina et al. | 700/1 |
| 2007/0005195 A1* | 1/2007 | Pasquale et al. | 700/295 |
| 2007/0220907 A1 | 9/2007 | Ehlers | |
| 2008/0046387 A1* | 2/2008 | Gopal et al. | 705/412 |
| 2008/0106147 A1 | 5/2008 | Caggiano et al. | |
| 2008/0167756 A1* | 7/2008 | Golden et al. | 700/297 |
| 2008/0281473 A1* | 11/2008 | Pitt | 700/291 |
| 2009/0187499 A1* | 7/2009 | Mulder et al. | 705/30 |
| 2009/0189445 A1* | 7/2009 | Strizki | 307/21 |
| 2010/0082174 A1* | 4/2010 | Weaver | 700/295 |
| 2010/0101254 A1 | 4/2010 | Besore | |
| 2010/0114799 A1* | 5/2010 | Black et al. | 705/412 |

(Continued)

*Primary Examiner* — Jeffrey A Gaffin
*Assistant Examiner* — Darrin Dunn
(74) *Attorney, Agent, or Firm* — Global Patent Operation

(57) ABSTRACT

A household energy management system is provided comprising a controller for managing power consumption of multiple devices within a household wherein the controller monitors energy usage data from a utility. The system further provides a utility meter for measuring an amount of energy usage by the household and a user interface through which a user can enter a parameter of the energy usage. The system yet further provides a local generator for generating energy for one or more of the energy consuming devices wherein the controller initiates the generator and changes at least some of the energy usage from the utility to the local generator when the energy usage level is within a predetermined percentage range of the parameter.

18 Claims, 2 Drawing Sheets

U.S. PATENT DOCUMENTS

| | | | |
|---|---|---|---|
| 2010/0211233 A1* | 8/2010 | Roscoe et al. | 700/296 |
| 2010/0245103 A1* | 9/2010 | Plaisted et al. | 340/657 |
| 2010/0293045 A1* | 11/2010 | Burns et al. | 705/14.11 |
| 2010/0312414 A1* | 12/2010 | Kumar | 700/295 |
| 2011/0106328 A1* | 5/2011 | Zhou et al. | 700/291 |
| 2011/0125337 A1* | 5/2011 | Zavadsky et al. | 700/291 |
| 2011/0202467 A1* | 8/2011 | Hilber et al. | 705/80 |
| 2011/0204720 A1* | 8/2011 | Ruiz et al. | 307/66 |
| 2012/0010757 A1* | 1/2012 | Francino et al. | 700/291 |
| 2012/0078432 A1* | 3/2012 | Weatherhead et al. | 700/295 |

* cited by examiner

GENERATOR DEMAND RESPONSE BEHAVIOR

BACKGROUND

Many power providers are currently experiencing a shortage of electric generating capacity due to increasing consumer demand for electricity. More specifically, generating plants are often unable to meet peak power demands resulting from electricity demanded by many consumers at the same time.

In order to reduce high peak power demand, many power providers have instituted time of use metering and rates which include higher rates for energy usage during 'on-peak' times and lower rates for energy usage during 'off-peak' times. As a result, consumers are provided with an incentive to use electricity at off-peak times rather than on-peak times and/or look for other 'local' or 'resident' energy sources for supplemental generation of energy.

Presently, to take advantage of the lower cost of electricity during off-peak times, a user must manually operate appliances or other electronic devices during the off-peak times. This is undesirable because a consumer may not always be present in the home, or awake, to operate the appliance during off-peak hours. This is also undesirable because the consumer is required to manually track the current time to determine what hours are off-peak and on-peak. Therefore, there is a need to provide a system that facilitates operating appliances or other devices during off-peak hours in order to reduce consumer's electric bills and to reduce the load on generating plants during on-peak hours. Additionally, there is a need to provide a system that (in combination with the aforementioned) incorporates a method for enlisting the generation of energy at a 'local' source that can be used to supplement the energy being supplied by a utility, wherein a cost of energy generation at the 'local' source is compared against the cost of energy supplied from the utility.

SUMMARY

In one aspect of the disclosure, a household energy management system is provided comprising a controller for managing power consumption of at least some of the multiple devices for a household wherein the controller monitors energy usage data from a utility. The system further provides a utility meter for measuring an amount of the energy usage data by the household and a user interface through which a user can enter a parameter of the energy usage. The system yet further provides a local generator for generating local energy at the household for one or more of the energy consuming devices, wherein the controller automatically initiates the operation of the local generator when the energy usage of the energy consuming devices exceeds a predetermined energy usage level. A demand server is provides for switching at least some of the energy usage from the utility to the local generator. A communication network is provided for connecting the controller to the utility meter, the local generator, and the demand server; and, wherein the controller switches circuits through the demand server and changes at least some of the energy usage from the utility to the local generator during a period when said energy usage level is within the predetermined percentage range of the parameter.

In yet another aspect, the disclosure provides a household energy management system comprising: a controller for managing power consumption of multiple devices within a household wherein the controller monitors energy rates from a utility. A utility meter is provided for measuring an amount of energy usage by the household. The system further provides a user interface through which a user can enter a parameter of energy usage. A local generator is also provided for generating local energy at the household for the household, wherein the controller automatically initiates operation of the local generator when the energy rates are above the parameter of energy usage, wherein the parameter is an energy cost of generating local energy at the household. A communication network connects the controller to one or more of the utility meter, the local energy source, and a demand server; and, the controller switches circuits through the demand server and switches or dispatches at least some of the energy demand from the utility to the local energy source when the energy rates are above the parameter of energy usage.

In yet still a further aspect, the disclosure provides a household energy management system comprising a controller for managing power consumption of multiple specified devices within a household, wherein the controller monitors energy demand from a utility. A utility meter is provided for measuring an amount of energy usage by the household. The system further provides a user interface through which a user can enter a parameter of energy usage. The system still further is provided with a local generator for generating local energy at the household for one or more of the energy consuming devices. The controller automatically initiates the generator when the energy demand of the multiple specified devices is above a parameter of energy usage, wherein the parameter is the energy demand from the utility. A communication network connects the controller to one or more of the utility meter, the local energy source, and a demand server; and, wherein the controller switches circuits through the demand server and switches or dispatches at least some of the energy demand from the utility to the local energy source during a period when the energy demand is above the parameter.

DETAILED DESCRIPTION

Figure 1:
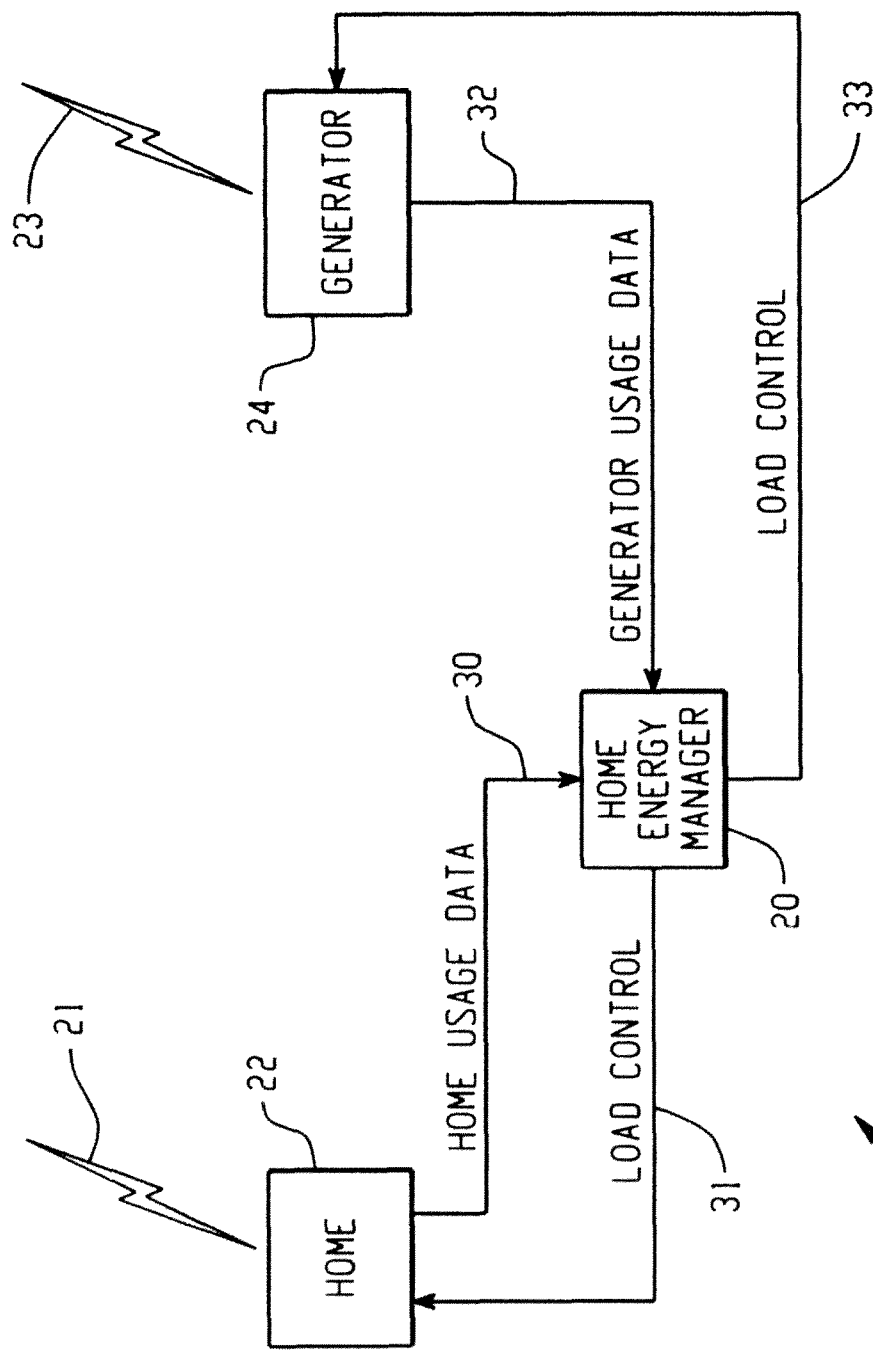
FIG. 1 is a block diagram of a home energy manager.

The present disclosure is an energy management system that may be used with an appliance, and/or a household of devices, in order to reduce household electricity costs and also to reduce the load on generating plants during peak hours of electricity usage. The energy management system is applicable to, and can be used in conjunction with, any type of device(s) such as a dryer, a washing machine, a dishwasher, an oven, a refrigerator, pool pump, load connected to a 120 v outlet, load connected to a 240 v outlet, etc.

In one embodiment, the energy management system may include a user interface, a time keeping mechanism, and a mode selecting device. The user interface may be any type of interface such as a touch screen, knobs, sliders, buttons, speech recognition, etc, to allow a user to input a schedule of on-peak times or schedules and off-peak times or schedules for each day of the week. The schedule of on-peak times and off-peak times for a household may typically be obtained from a generating plant or power utility that services the household. The schedule may be obtained from published tables made available to the public or other means such as billing statements. If the schedule of times changes, the user may use the user interface to alter and update the schedule that was previously entered.

The terms "on-peak" and "off-peak", as used herein are meant to encompass time periods that an energy supplier has designated as referring to periods of high energy demand or cost and periods of low energy demand or cost, respectively. It may be that in some situations, multiple levels are designated by the energy supplier and thus on-peak is meant to refer to those periods where the energy demand or cost is greater than some other period, with the other period being referred to as off-peak. In any given situation, on-peak may not be the highest level of cost or energy demand and off-peak may not be the lowest level of cost or energy demand.

The energy management system 10 can also include a time keeping mechanism (not shown) that provides information to the devices within a household and user regarding the current time of the day. In one embodiment, the time keeping mechanism also includes a calendar function to provide information regarding the day of the week and the current date. The current time and date may be input or adjusted by the user via controls on the time keeping mechanism.

Utility companies are starting to develop sliding rate scales based upon time of use for power consumption. A home that can manage a response to a different rate schedule will be able to consume energy more cost effectively. A time of day (TOD) import to the devices in the household will allow the unit to run at times, on more occasions, and/or during more periods when utility rates are low or off-peak. The time of day input can be manually entered or automatically received by the devices (an example of automatic updating would be using a radio wave or radio clock to sync to an atomic clock signal, or updates would be received from the meter network or from the interne etc. . . . ). The time of day feature or off-peak manager can effectively save the consumer money by running the devices according to a pre-determined schedule, i.e. predominantly, when the rates are lower. To be described in more detail hereinafter, the energy management system 10 can also provide a local energy source or local/resident generator to substitute, apportion, or supplement energy supplied by the utility for household consumption.

In addition to the aforementioned, the mode selecting device allows the user to select an energy management mode which utilizes the local energy source. The mode selecting device may be a single button such that the energy management mode is selected when the button is depressed. Alternatively, the mode selecting device may also be two separate buttons, a switch, a touch panel, or any other type of device that allows for selection of the energy management mode. Although the control panel, the user interface, the time keeping mechanism and the mode selecting device (not illustrated) can be four separate elements, each of these elements, or any combination thereof, may alternatively be incorporated into a single interface or display to provide for ease of use.

The present disclosure contemplates the use of algorithms in a home energy manager (HEM) or controller 20 to compare the cost of energy 27 (i.e. energy rate) from a utility 21 supplied to the household 22 to the cost of energy 23 from a local generator or local power source 24 (i.e. solar, wind power, gas powered generator etc.). The algorithm will allow the devices in the household to be supplied solely by the "utility generated" energy until the local power source 24 is initiated.

The energy management system 10 can further include the controller 20 connected to the control panel and the mode selecting device in order to receive signals regarding the operation selected by the user via the control panel and the mode selected by the user via the mode selecting device. The controller 20 can also be connected to the user interface and the time keeping mechanism, and preferably includes a memory for storing the schedule of on-peak and off-peak times input via the user interface, as well as the current time and date. In one embodiment, the controller 20 has a circuit, software, and/or firmware (hereafter collectively referred to as "firmware") to determine a time to initiate the selected operation based on the selected mode, and also to determine whether a local power source or local energy generator 24 should be utilized (to be described hereinafter).

The present disclosure provides a system and method for coordinating a suite of demand response devices that are capable of responding to incoming signals from utilities 21 signifying an on peak period (i.e. a load shedding event). In addition to the devices that are demand response ready, the HEM 20 can provide feedback to the user regarding the performance of the devices through home usage data 30. The user will be able to monitor and/or modify the device responses as well as get real time feedback as to the energy consumption of the devices. For electrical devices, the HEM 20 can rely upon current transducers, shunts, meter pinging, or lookup tables or algorithms to characterize the power consumption of the devices at any given point.

Referring to FIG. 1, the present disclosure provides a system and method of providing information to the HEM 20 from the local generator 24 (via generator usage data 32) wherein the HEM 20 can control (i.e. load control 33) the local generator 24 to optimize the overall energy usage, demand, or need levels. The generator 24 can be used in several ways to optimize the energy usage within a home 22. For example, the generator 24 can be automatically started and the home 22 can be taken off the utility grid, using switch circuits via isolation circuit, during specific grid loading or price point states. If, for example, generator 24 is a gas powered generator, fuel consumption rates can be monitored on a real time basis using flow sensors, level sensors, or mass sensors or some combination thereof, and the system can make suggestions to which loads to curtail and then predict the remaining time for fuel to run out with each suggestion. In conjunction with knowing the load on the generator 24 (i.e. data can be retrieved from the HEM 20), and the fuel usage rates at a given load, a cost analysis can be done to predict cost to operate for remaining hours or minutes of fuel. The HEM 20 can present the user with pie charts showing the usage over a number of days and prioritize the devices in the order of load or consumption over the timeframe. The system can continually and automatically control loads 31, 33 to prevent running out of fuel, using a priority curtailment scheme (for instance, the refrigerator would be the last item to curtail or possibly the load to never curtail, heat may be next, critical lighting next, etc.). The user can specify a predetermined duration for the fuel in the tank to last last and the system 10 could layout a usage pattern for the user to achieve this goal, or tell the user that the goal was unrealistic. Likewise, the system 10 could predict when the fuel would run out by looking at previous days and assuming that today will be equivalent. The system could also import weather data forecasts using an internet connection to better predict fuel usages. The system 10 can provide this information to the user which would then allow the user to modify the load control 33 to conserve fuel. The system 10 can also process data to search for outliers between different days usage, and flag the devices/appliances that caused any outlier (the HEM would know what device was running when). For example, the system might be aware that the refrigerator used an excessive amount of energy during a given timeframe due to excessive door openings and could flag the user regarding this fact. Suggestions could be made to the user to modify or curtail these loads to minimize the usages. It is to be appreciated that the system 10 networks the HEM or controller 20 to one or more of the utility meter 40, the local energy source (local generator) 24, and a demand server 42. The HEM 20 switches circuits through the demand server 42 and switches or dispatches at least some of the energy demand from the utility 21 to the local energy source generator 24 at pre-determined scheduled periods or per-determined threshold periods.

Figure 2:
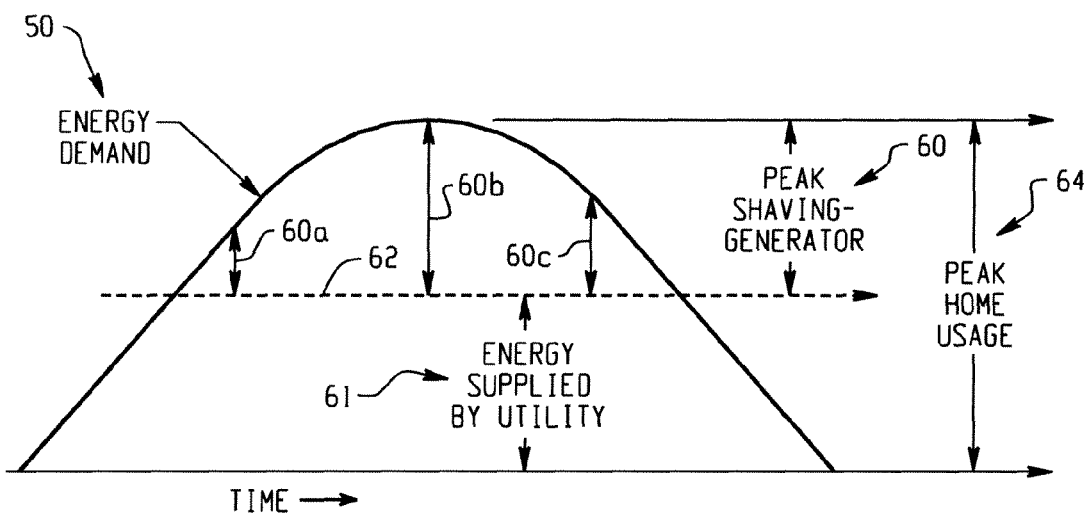
FIG. 2 is a graph displaying energy usage wherein a local or resident generator can be used for energy peak shaving.

The generator can be designed with the capability to modify the waveshape of the output signal to provide a different RMS output voltage. This waveform change could be triggered by demand response events to again lessen the load on the generator. The generator's internal combustion engine can further be provided with a turbocharger or supercharger to provide varying output power to coincide with variable loads that might be encountered. The wastegate of the turbocharger or supercharger can be controlled by input signaling to adjust the power output as required. This would provide for a system that would use less fuel in low load conditions, yet have the power for high loading conditions. The generator can be setup with multiple voltages, including a panel setup, to provide lower voltages to be connected to specific branch circuits that have pure resistance loads (such as incandescent lighting, hair dryers, space heaters, etc) to lessen the power consumption. The lower voltage outputs could be triggered via utility demand state or cost signal inputs. Providing the HEM with the ability to determine a conversion rate between electricity/natural gas/other resources, the total cost of running a load can be optimized by using the power from different sources. The local generator 24 can be used for peak demand 64 or energy peak shaving 60, i.e. if the whole home energy demand 50 is beyond a certain point or threshold 62 then the local generator 24 can be initiated to cover for the peak demand 60 above the threshold 62 (FIG. 2)

With reference again to FIG. 2, the triggering of the generator 24 to supplement or replace the "utility provided" energy can be better defined as noted below. The solid curve shows a given household energy demand 50 during a twenty-four hour period. The threshold 62 is a limit that can be set by the homeowner, beyond which the goal is to truncate the usage of energy provided by the utility 61. Once this threshold 62 is achieved, the peak shaving generator energy 60 will be supplied to the household by the generator to supplement the "utility provided" energy 61 beyond the threshold level 62. In this manner, the energy management system will initiate the generator to start and begin providing energy as the threshold 62 is engaged. Referring to FIG. 2, it is to be appreciated that the demand upon the generator will vary (reference 60a, 60b, and 60c in FIG. 2) in time as the total household demand 50 follows the whole home usage curve and the "utility provided" energy level 61 remains constant at threshold 62. The aforementioned provides a system for managing the energy usage and energy demands of the home and gives the user an option to switch between different sources of energy (main utility and 'local' generation). Minimizing the overall cost of running energy loads in the home is an attractive option for the customer. Decreasing the load on the grid during a peak time period or peak consumption 64 is beneficial for the utilities as it is a decrease in load for their system.

It is to be appreciated that the operation of the local generator 24 can be initiated by one of several instances that are being monitored by the energy management system 10. These instances can be as straight-forward as an incoming signal from the utility requesting the shedding of load on the grid, or can be more complex involving price comparisons between running the local generator 24 to generate power versus purchasing energy 100% from the utility at the going rate. Likewise, the user could select thresholds that are programmed into the energy management system 10 that trigger the local generator 24 to start and deliver energy at the moment the threshold is exceeded. Additionally, the output or loading of the local generator 24 could be adjusted or throttled based on multiple thresholds being achieved. This adjustment in output could be achieved by a speed adjustment in the local generator 24 or with other means of loading or unloading the generator.

In another embodiment, a method is provided for managing energy usage of a plurality of appliances. The method can comprise receiving a schedule having a peak demand or cost period; storing the schedule in a memory; determining the current time; and initiating operation of the local generator during the peak demand or cost period; initiating the operation of the local generator when the total energy usage exceeds a specific user defined threshold as defined via the energy management system user interface.

While various embodiments of the application have been described, it will be apparent to those of ordinary skill in the art that many more embodiments and implementations are possible that are within the scope of this disclosure. Accordingly, the disclosure is not to be restricted except in light of the attached claims and their equivalents.

The invention claimed is:

1. A household energy management system for a household having multiple energy consuming devices that receive energy from a utility, the system comprising:
   a controller for managing power consumption of at least some of the multiple energy consuming devices, wherein the controller monitors energy usage of the at least some of the multiple energy consuming devices;
   a meter for measuring an amount of said energy usage by the household;
   a user interface through which a user can enter a predetermined total energy usage threshold;
   a local generator for generating energy for one or more of the multiple energy consuming devices;
   a demand server for switching at least some of said energy usage from the utility to said local generator;
   a communication network connecting the controller to said meter, said local generator, and said demand server;
   wherein the controller is operative to automatically initiate operation of said local generator when a total energy usage of the household exceeds the predetermined total energy usage threshold;
   wherein the controller switches circuits through said demand server and changes at least some of the energy usage from said utility to the local generator during a period when the total energy usage of the household exceeds the predetermined total energy usage threshold;
   wherein said controller further monitors a fuel consumption rate of said local generator using at least one of flow sensors, level sensors, mass sensors and predicts a remaining operation period based on the fuel consumption rate and a current fuel supply amount, and wherein said controller includes a hierarchy of an order and manner to disable, suspend, or reduce one or more of the devices to enable the fuel consumption rate to extend for a user specified duration;
   wherein the hierarchy includes a priority curtailment scheme and order for curtailing power to the energy consuming devices; and
   wherein the priority curtailment scheme includes exclusion of particular energy consuming devices from a suspension of power.

2. The household energy management system of claim 1, wherein said controller switches circuits through said demand server and changes all of said energy usage from said utility to said local generator during a period when the total energy usage of the household exceeds the predetermined total energy usage threshold.

3. The household energy management system of claim 2, wherein said controller allocates energy to one or more multiple energy consuming devices based on one or more of the following: a demand limit, a prioritization of each of the one or more multiple energy consuming devices, an energy usage level of each of the one or more multiple energy consuming devices, and a supply limit.

4. The household energy management system of claim 3, wherein said controller instructs one or more of the multiple energy consuming devices to shed energy usage, and wherein at least one device of the multiple energy consuming devices sheds load or increases load based on an energy usage level of another device of the multiple energy consuming devices.

5. The household energy management system of claim 1, wherein the controller searches for outliers of energy usage and flags one or more devices of the multiple energy consuming devices that caused the outliers to the user.

6. The household energy management system of claim 5, wherein the controller further provides suggestions to the user to modify or curtail loads of the one or more devices of the multiple energy consuming devices.

7. The household energy management system of claim 1, wherein the local generator has multiple voltages wherein lower voltages are connected to specific branch circuits that have pure resistance loads.

8. A household energy management system, comprising:
a controller for managing power consumption of multiple devices within a household, the controller monitoring energy rates from a utility;
a meter for measuring an amount of energy usage to the household;
a user interface through which a user can enter a cost of generating local energy at the household;
a local generator for generating local energy at the household, wherein the controller automatically initiates the local generator when a cost to use energy from the utility based on the energy rates is above the cost of generating local energy at the household; and
a communication network connecting the controller to one or more of the meter, the local generator, and a demand server,
wherein the controller switches circuits through the demand server and changes at least some of the energy demand from the utility to the local generator when the cost to use energy from the utility based on the energy rates is above the cost of generating local energy at the household,
wherein said controller further monitors a fuel consumption rate of said local generator using at least one of flow sensors, level sensors, mass sensors and predicts a remaining operation period based on the fuel consumption rate and a current fuel supply amount, and wherein said controller includes a hierarchy of an order and manner to disable, suspend, or reduce one or more of the multiple devices to enable the fuel consumption rate to extend for a user specified duration,
wherein the hierarchy includes a priority curtailment scheme and order for curtailing power to the multiple devices, and
wherein the priority curtailment scheme includes exclusion of particular devices from a suspension of power.

9. The household energy management system of claim 8, wherein the controller switches circuits through the demand server and changes all of the energy demand from the utility to the local generator.

10. The household energy management system of claim 8, wherein the switching circuits corresponds to peak utility demand periods.

11. The household energy management system of claim 9, wherein the switching circuits corresponds to peak utility demand periods.

12. A household energy management system, comprising:
a controller for managing power consumption of multiple devices within a household, the controller monitoring an energy demand from a utility;
a meter for measuring an amount of energy usage to the household;
a user interface through which a user can communicate with the controller;
a local generator for generating local energy at the household, wherein the controller automatically initiates the local generator when an energy demand of the multiple devices is above the energy demand from the utility; and
a communication network connecting the controller to one or more of the meter, the local generator, and a demand server,
wherein the controller switches circuits through the demand server and changes at least some of the energy demand from the utility to the local generator during a period when the energy demand of the multiple devices is above the energy demand from the utility,
wherein said controller further monitors a fuel consumption rate of said local generator using at least one of flow sensors, level sensors, mass sensors and predicts a remaining operation period based on the fuel consumption rate and a current fuel supply amount, and wherein said controller includes a hierarchy of an order and manner to disable, suspend, or reduce one or more of the multiple devices to enable the fuel consumption rate to extend for a user specified duration,
wherein the hierarchy includes a priority curtailment scheme and order for curtailing power to the multiple devices,
wherein the priority curtailment scheme includes exclusion of particular devices from a suspension of power.

13. The household energy management system of claim 12, wherein the controller switches circuits through the demand server and changes all of the energy demand from the utility to the local generator during the period when the energy demand of the multiple devices is above the energy demand from the utility.

14. The household energy management system of claim 13, wherein the controller allocates energy to one or more of the multiple devices based on one or more of the following: a demand limit, a prioritization of each of the one or more of the multiple devices, an energy demand level of each of the one or more of the multiple devices, and a supply limit of the local generator.

15. The household energy management system of claim 14, wherein the controller instructs one or more of the multiple devices to shed load demand.

16. The household energy management system of claim 12, wherein the controller searches for outliers of energy usage and flags one or more of the multiple devices that caused the outliers to the user.

17. The household energy management system of claim 16, wherein the controller further provides suggestions to the user to modify or curtail loads of the one or more of the multiple devices.

18. The household energy management system of claim 12, wherein the local generator has multiple voltages wherein lower voltages are connected to specific branch circuits that have pure resistance loads.

\* \* \* \* \*

UNITED STATES PATENT AND TRADEMARK OFFICE
CERTIFICATE OF CORRECTION

PATENT NO. : 8,423,194 B2  
APPLICATION NO. : 13/042526  
DATED : April 16, 2013  
INVENTOR(S) : Besore et al.

Page 1 of 1

It is certified that error appears in the above-identified patent and that said Letters Patent is hereby corrected as shown below:

In the Specification

In Column 3, Line 31, delete "interne" and insert -- internet --, therefor.

Signed and Sealed this  
Eleventh Day of June, 2013

Teresa Stanek Rea  
*Acting Director of the United States Patent and Trademark Office*